US012400514B2

(12) United States Patent
Hawkins et al.

(10) Patent No.: US 12,400,514 B2
(45) Date of Patent: Aug. 26, 2025

(54) METHODS AND SYSTEMS FOR OVERLAID PAY MODALITIES ON SELECTED SYMBOLS IN GAMING MACHINES

(71) Applicant: Aristocrat Technologies Australia Pty Limited, North Ryde (AU)

(72) Inventors: Ryan Hawkins, Henderson, NV (US); Stephanie Johns, Las Vegas, NV (US); Yanis Tsombanidis, Las Vegas, NV (US); Robert Honeycutt, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/521,761

(22) Filed: Nov. 28, 2023

(65) Prior Publication Data

US 2024/0096167 A1 Mar. 21, 2024

Related U.S. Application Data

(63) Continuation of application No. 17/543,220, filed on Dec. 6, 2021, now Pat. No. 11,830,314, which is a (Continued)

(51) Int. Cl.
*G07F 17/32* (2006.01)
*G07F 17/34* (2006.01)

(52) U.S. Cl.
CPC ...... *G07F 17/3213* (2013.01); *G07F 17/3258* (2013.01); *G07F 17/34* (2013.01)

(58) Field of Classification Search
CPC ... G07F 17/3213; G07F 17/3258; G07F 17/34
See application file for complete search history.

(56) References Cited

U.S. PATENT DOCUMENTS 9,424,720 B2 * 8/2016 Suda ...................... G07F 17/32
10,089,819 B1 10/2018 Halvorson
(Continued)

OTHER PUBLICATIONS

Australian Examination Report No. 1 issued in App. No. AU2018236797, dated Oct. 18, 2022, 2 pages.
(Continued)

*Primary Examiner* — Ronald Laneau
(74) *Attorney, Agent, or Firm* — Greenberg Traurig, LLP

(57) ABSTRACT

A gaming machine may be configured for supporting games that include use of pay modalities, which are overlaid on selected symbols. The gaming machine includes a credit input mechanism configured for establishing a credit balance that is increasable and decreasable based on wagering activities, a display having a plurality of display positions, and a game controller to select a plurality of symbols, to cause the display to display the selected symbols, to determine if the selected symbols associated with at least one of one or more predetermined reels of the plurality of reels include a special symbol, and if so, to determine one or more special values associated with the special symbol, and to overlay a particular one of the one or more special values on each displayed instance of the special symbol. The game controller determines a payout based on assigned special values associated with the displayed special symbol.

20 Claims, 13 Drawing Sheets

Related U.S. Application Data continuation of application No. 16/933,963, filed on Jul. 20, 2020, now Pat. No. 11,195,367, which is a continuation of application No. 16/143,101, filed on Sep. 26, 2018, now Pat. No. 10,720,007.

(60) Provisional application No. 62/565,997, filed on Sep. 29, 2017.

(56) References Cited

U.S. PATENT DOCUMENTS

| | | | | |
|---|---|---|---|---|
| 10,468,745 | B2 | 11/2019 | Jeon | |
| 10,546,466 | B2 | 1/2020 | Lee | |
| 10,872,502 | B2 | 12/2020 | Kendall | |
| 11,468,745 | B2 | 10/2022 | Lee | |
| 11,741,777 | B2 * | 8/2023 | Penacho | G07F 17/34 463/20 |
| 2008/0113735 | A1 | 5/2008 | Maya | |
| 2009/0124364 | A1 | 5/2009 | Cuddy | |
| 2010/0029364 | A1 | 2/2010 | Zielinski | |
| 2012/0034968 | A1 | 2/2012 | Watkins | |
| 2012/0077564 | A1 | 3/2012 | Collette | |
| 2014/0295935 | A1 | 10/2014 | Pawloski | |
| 2014/0295936 | A1 | 10/2014 | Pawloski | |
| 2014/0309010 | A1 | 10/2014 | Pawloski | |
| 2014/0309011 | A1 | 10/2014 | Pawloski | |
| 2015/0105138 | A1 | 4/2015 | Delekta | |
| 2015/0332560 | A1 | 11/2015 | Fulton | |
| 2015/0348357 | A1 | 12/2015 | Bartosik | |
| 2016/0140793 | A1 | 5/2016 | Marks | |
| 2017/0046911 | A1 | 2/2017 | Batsiokis | |
| 2017/0084112 | A1 | 3/2017 | Batsiokis | |
| 2017/0092067 | A1 | 3/2017 | Batsiokis | |
| 2019/0355206 | A1 | 11/2019 | Kania | |
| 2020/0184766 | A1 | 6/2020 | Halvorson | |
| 2020/0364972 | A1 * | 11/2020 | Hawkins | G07F 17/3258 |
| 2020/0368604 | A1 * | 11/2020 | Höpcke | B63B 32/47 |
| 2022/0309871 | A1 | 9/2022 | Hawkins | |
| 2023/0077685 | A1 * | 3/2023 | Gupta | G07F 17/3267 463/20 |
| 2023/0306809 | A1 | 9/2023 | Hawkins | |

OTHER PUBLICATIONS

Notice of Allowance dated Mar. 18, 2020, for U.S. Appl. No. 16/143,101 (pp. 1-5).

Office Action (Notice of Allowance and Fees Due (PTOL-85)) dated Aug. 17, 2021 for U.S. Appl. No. 16/933,963 (pp. 1-9).

Office Action (Non-Final Rejection) dated Apr. 6, 2023 for U.S. Appl. No. 17/543,220 (pp. 1-6).

Office Action (Notice of Allowance and Fees Due (PTOL-85)) dated Jul. 20, 2023 for U.S. Appl. No. 17/543,220 (pp. 1-5).

Office Action (Non-Final Rejection) dated Oct. 5, 2023 for U.S. Appl. No. 17/704,949 (pp. 1-14).

Office Action (Notice of Allowance and Fees Due (PTOL-85)) dated Jan. 24, 2024 for U.S. Appl. No. 17/704,949 (pp. 1-8).

Office Action (Non-Final Rejection) dated Nov. 19, 2024 for U.S. Appl. No. 18/521,761 (pp. 1-7).

Australian Examination Report No. 1 issued in App. No. AU2023251469, dated Aug. 27, 2024, 2 pages.

* cited by examiner

800

900

1000

*FIG. 11*
Tarzan
$20,000.62
MAJOR
$100.99
MINOR
$21.98
J
Q
WILD
MINOR
$21.98
BET
WIN
925
CREDIT
19935
1C

1100

METHODS AND SYSTEMS FOR OVERLAID PAY MODALITIES ON SELECTED SYMBOLS IN GAMING MACHINES

RELATED APPLICATIONS

The present application is a continuation of and claims priority to U.S. patent application Ser. No. 17/543,220, filed on Dec. 6, 2021, and entitled "Methods and Systems for Overlaid Pay Modalities on Selected Symbols in Gaming Machines" which is a continuation of U.S. patent application Ser. No. 16/933,963, filed on Jul. 20, 2020, issued on Dec. 7, 2021, as U.S. Pat. No. 11,195,367, which is a continuation of U.S. patent application Ser. No. 16/143,101, filed Sep. 26, 2018, which issued on Oct. 7, 2021, as U.S. Pat. No. 10,720,007, which claims priority to U.S. Provisional Patent Application Ser. No. 62/565,997, filed on Sep. 29, 2017, all of which are hereby incorporated herein by reference in their entireties.

BACKGROUND

Gaming systems or machines may allow players to win awards. The awards may be determined based on predefined pay criteria. A need exists to maintain or increase player enjoyment when using such gaming systems or machines.

Further limitations and disadvantages of conventional and traditional approaches will become apparent to one of skill in the art, through comparison of such systems with some aspects of the present disclosure as set forth in the remainder of the present application with reference to the drawings.

SUMMARY

In electronic gaming systems, a plurality of reels having symbols are spun so as to allow a player to win an award depending on which of the symbols are displayed. The award is determined based on, for example, a paytable. As noted above, however, a need exists for new gaming systems in order to maintain or increase player enjoyment. Accordingly, methods and system are provided for a overlaid pay modalities on selected symbols in gaming machines, substantially as shown in and/or described in connection with at least one of the figures, as set forth more completely in the claims.

In this regard, gaming machines, particularly electronic gaming machines (EGMs), or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (e.g., return to player (RTP)) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Embodiments in accordance with the present invention provide alternate and enhanced ways of augmenting the pays of certain symbols beyond the paytable.

In various embodiments, systems, machines, and/or methods may be provided for paying, displaying, and/or revealing a prize, wherein a feature prize, and/or progressive jackpot, is revealed and/or displayed via spinning of a plurality of reels, substantially as shown in and/or described in connection with at least one of the figures, as set forth more completely in the claims.

One embodiment provides a gaming machine that uses an additional method for paying winning symbol combinations. A plurality of pay modalities are overlaid on selected symbols. The pay modalities may include, but are not limited to, credits, cash bonuses, jackpots, feature triggers, etc. When the selected symbol is included in a winning pay, the overlaid pay modality is also paid. The overlaid pay modality is paid only once per selected symbol regardless of the number of lines or coinciding ways for that symbol. The inclusion of a pay modality for a symbol on a reel is universal for that symbol on that reel. The pay modality that is placed on a symbol is chosen randomly from a weighted list of possible choices. The weighted list may differ for different reels and for different symbols. This provides a unique method of awarding jackpots that is highly visible.

In an example embodiment, a method is provided for playing a feature game on a gaming machine that comprises a display, a game controller, a credit input mechanism, and a credit meter; with the credit input mechanism being configured to receive a physical item representing a monetary value for establishing a credit balance, the credit balance being increasable and decreasable based on a wagering activity, and with the credit meter being configured to monitor the credit balance. The method may comprise selecting a plurality of symbols from a symbol set; assigning the selected symbols to a plurality of reels; displaying the plurality of reels, via the display, with the displaying comprising, in response to determining that selected symbols associated with at least one of one or more predetermined reels of the plurality of reels include a special symbol; determining one or more special values associated with the special symbol and overlaying a particular one of the one or more special values on each displayed instance of the special symbol; and determining, via the game controller, a payout based on special values associated with the special symbol.

In an example embodiment, the method may further comprise determining the payout based on a determination that displayed symbols associated with at least another one of the one or more predetermined reels of the plurality of reels include the special symbol.

In an example embodiment, the method may further comprise randomly assigning each special value to each displayed instance of the special symbol.

In an example embodiment, the method may further comprise selecting each special value for the special symbol from a weighted list of possible values. The weighted list may comprise different values for different ones of the plurality of reels and/or for different symbols.

In an example embodiment, the method may further comprise assigning different special values to a particular special symbol for different ones of the plurality of reels.

In an example embodiment, displaying of the plurality of reels may comprise spinning the plurality of reels; and then stopping the spinning of each of the plurality of reels based on corresponding stopping criteria.

In an example embodiment, the method may further comprise randomly determining a plurality of stop positions for the plurality of reels.

In an example embodiment, the method may further comprise adjusting display options for at least one of the one or more predetermined reels, in response to determining that selected symbols associated with at least one reel other than the one or more predetermined reels include at least one wild symbol.

Adjusting the display options may comprises increasing number of displayed symbols for the at least one of the one or more predetermined reels.

In an example embodiment, a gaming machine is provided and configured for playing a feature game, with the gaming machine comprising a credit input mechanism, a display, a game controller, and a credit meter. The credit input mechanism may be configured to receive a physical item representing a monetary value for establishing a credit balance, the credit balance being increasable and decreasable based on at least on wagering activity. The display may have a plurality of display positions. The game controller may be configured to select a plurality of symbols from a symbol set; assign the selected symbols to a plurality of reels; cause display of the plurality of reels via the display; in response to determining that selected symbols associated with at least one of one or more predetermined reels of the plurality of reels include a special symbol: determine one or more special values associated with the special symbol; and cause the display to overlay a particular one of the one or more special values on each displayed instance of the special symbol; and determine a payout based on special values associated with the special symbol. The credit meter may be configured to monitor the credit balance, and to adjust the credit balance based on the determined payout.

In an example embodiment, the game controller may determine the payout based on a determination that displayed symbols associated with at least another one of the one or more predetermined reels of the plurality of reels include the special symbol.

In an example embodiment, the game controller may randomly assign each special value to each displayed instance of the special symbol.

The gaming machine of claim 11, wherein the game controller select each special value for the special symbol from a weighted list of possible values. The weighted list may comprise different values for different ones of the plurality of reels and/or for different symbols.

In an example embodiment, the game controller may assign different special values to a particular special symbol for different ones of the plurality of reels.

In an example embodiment, the game controller may cause the display to display spinning of the plurality of reels; and display stopping the spinning of each of the plurality of reels based on corresponding stopping criteria.

The gaming machine of claim 9, wherein the game controller randomly determines a plurality of stop positions for the plurality of reels that are used in determining when to stop spinning of each reel.

In an example embodiment, the game controller may, in response to determining that selected symbols associated with at least one reel other than the one or more predetermined reels include at least one wild symbol, adjust display options for at least one of the one or more predetermined reels.

In an example embodiment, the game controller may increase a number of displayed symbols for the at least one of the one or more predetermined reels.

These and other advantages, aspects and novel features of the present disclosure, as well as details of an illustrated embodiment thereof, will be more fully understood from the following description and drawings.

DETAILED DESCRIPTION

Figure 1A:
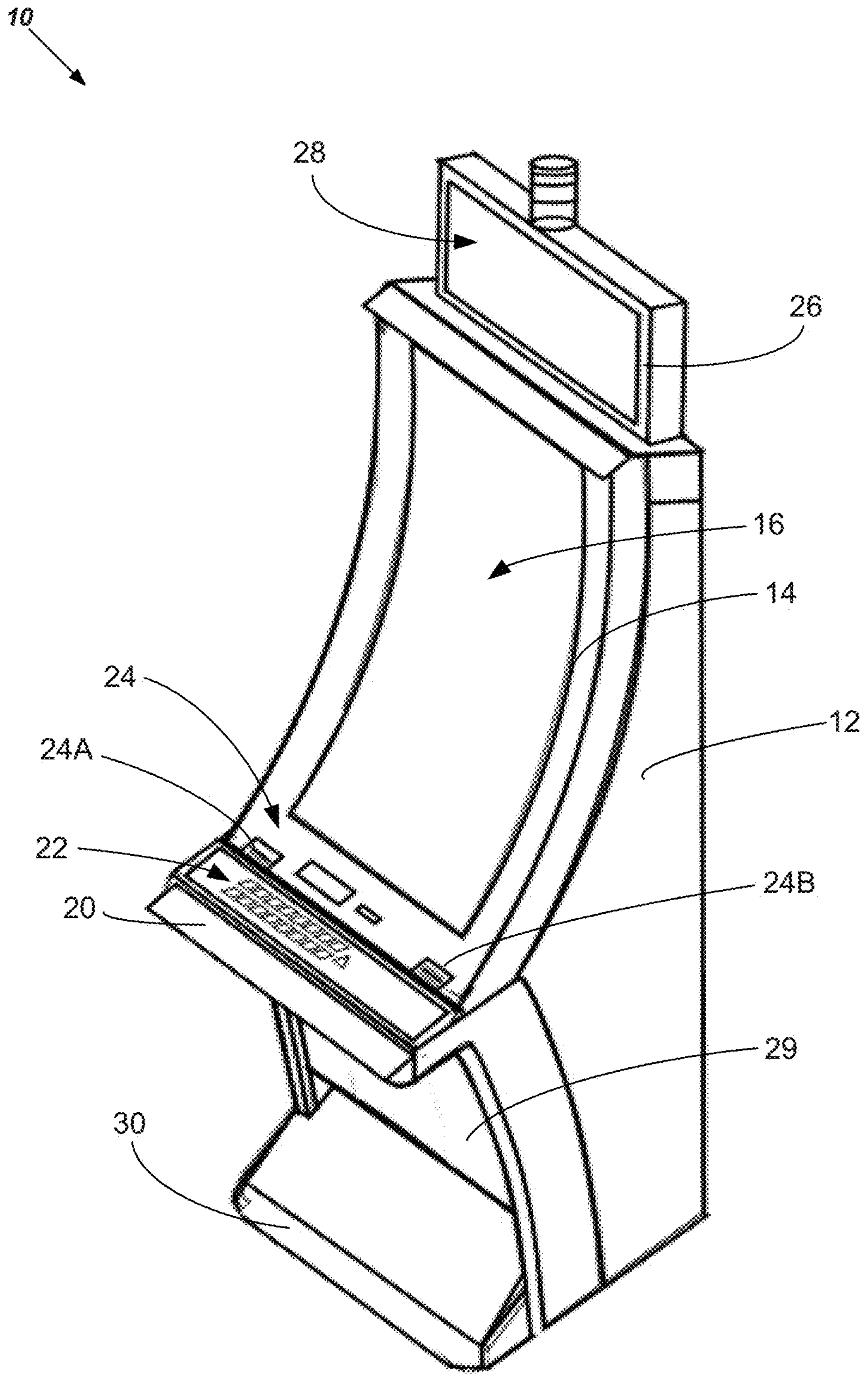
FIG. 1A is a perspective view of a standalone gaming machine.

Referring to the drawings, there is shown one or more embodiments of a gaming machine including a credit input mechanism configured to receive a physical item representing a monetary value for establishing a credit balance, the credit balance being increasable and decreasable based at least on wagering activity. The gaming machine includes meters configured to monitor the credit balance, a display having a plurality of display positions, and a game controller to select a plurality of symbols, to cause the display to display the selected symbols, to determine if the displayed symbols on a first plurality of reels include predetermined symbols, in response to determining that a first plurality of reels include predetermined symbols, to assign special value to a plurality of special symbols to a second plurality of reels, and to determine if the second plurality of reels include the special symbols with the assigned special values, and a payout mechanism to cause a payout associated with the assigned special values.

Gaming systems can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Referring to FIG. 1A, a gaming system in the form of a standalone gaming machine 10 includes a console 12 having a display 14 on which are displayed representations of a game 16 that can be played by a player. Mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card.

Other gaming machines may be configured to accept a ticket such that the credit input mechanism 24 may have a ticket reader (not shown) for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

As shown in FIG. 1A, a top box 26 may carry artwork 28, including for example pay tables and details of bonus awards and other information or images relating to the game. Further artwork and/or information may be provided on a front panel 29 of the console 12. Gaming machine 10 also includes a payout mechanism in the form of a coin tray 30 that is mounted beneath front panel 29 for dispensing cash payouts from gaming machine 10. Another form of a payout mechanism may include an embedded printer to print out a payout ticket associated with the credit balance that may be redeemed at a cage (not shown).

Display 14 shown in FIG. 1A is in the form of a liquid crystal display. Alternatively, display 14 may be a light emitting diode display, plasma screen, and/or any other suitable video display unit. Top box 26 may also include a display, for example a video display unit, which may be of the same type as display 14, or of a different type.

Figure 1B:
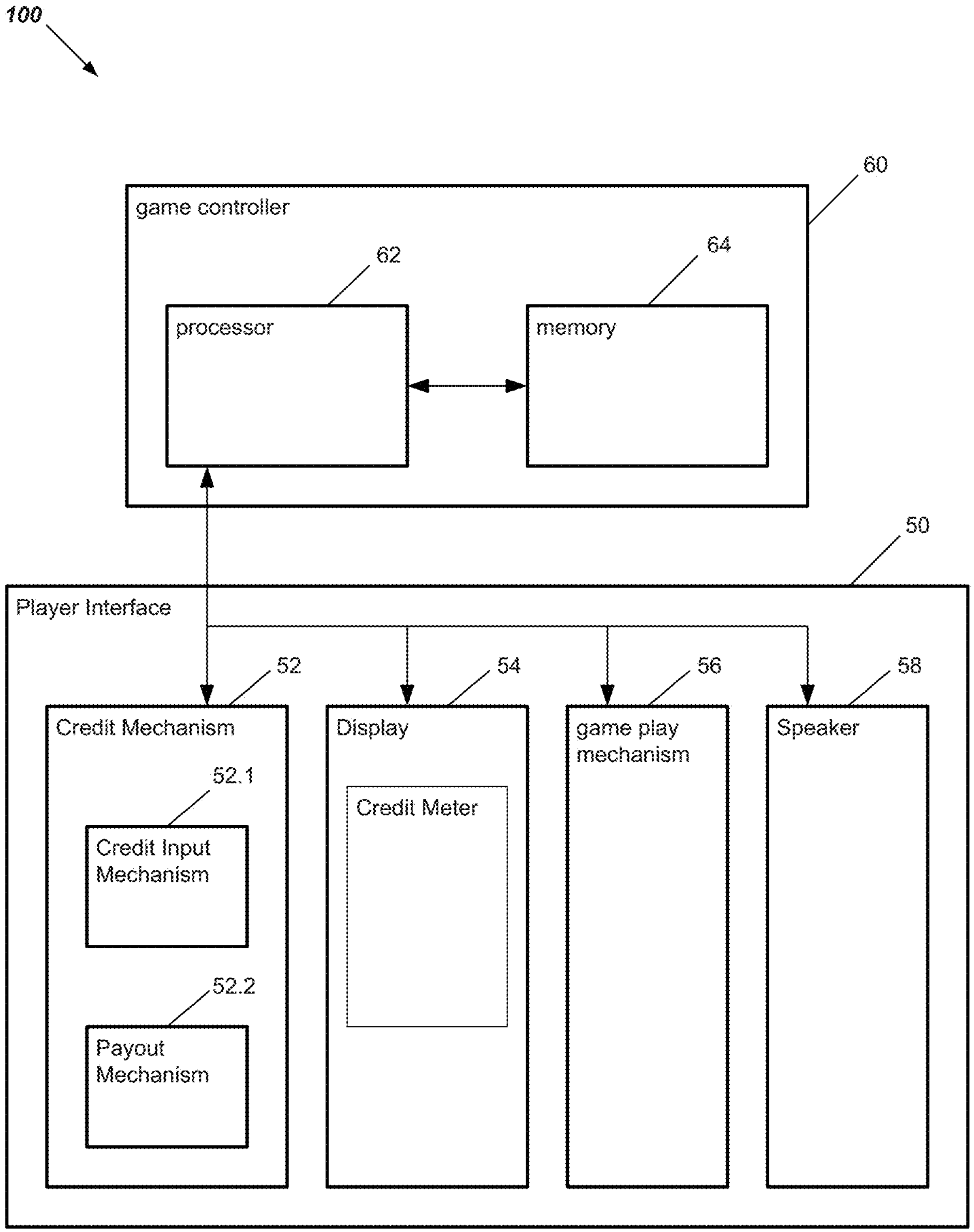
FIG. 1B is a block diagram of the core components of a gaming system.

Referring to FIG. 1B, a gaming system 100 has several core components. At the broadest level, the core components are a player interface 50 and a game controller 60. The player interface 50 enables manual interaction between a player and gaming system 100, and for this purpose includes input/output components required for the player to enter instructions to play a game and observe game outcomes.

Components of the player interface may vary from embodiment to embodiment but will typically include a credit mechanism 52 to enable a player to input credits. For example, in some embodiments, credit mechanism 52 may include a credit input mechanism 52.1 (e.g., similar to or corresponding to the input mechanism 24 of the gaming machine 10 of FIG. 1A) to receive a physical item representing a monetary value for establishing a credit balance. The credit balance may be increasable and decreasable based on wagering activities. Based on the established credit balance, the gaming system 100 initiates a game.

In some embodiments, the credit mechanism 52 also includes a payout mechanism 52.2 to cause a payout associated with the credit balance. The player interface may also include one or more displays 54, a game play mechanism 56 including one or more input devices that enable a player to input game play instructions (e.g., to place a wager), and one or more speakers 58. In some embodiments, each of the displays 54 includes a plurality of display positions. In other embodiments, each of the displays 54 includes a plurality of display areas. Each of the display areas includes a plurality of display positions. In the embodiment shown, the display 54 also includes a credit meter 54.1. In some embodiments, credit meter 54.1 displays credits available, credits bet, and/or credits won.

Game controller 60 is in data communication with player interface 50 and typically includes a processor 62 that processes game play instructions in accordance with game play rules and outputs game play outcomes to the display(s) 54. Typically, the game play rules are stored as program code in a memory 64 but can also be hardwired. In some embodiments, the memory 64 may also store data indicative of a plurality of symbols, pay tables, images, and other information to be used in games.

Herein the term "processor" is used to refer generically to any device that can process game play instructions in accordance with game play rules and may include: a microprocessor, microcontroller, programmable logic device or other computational device, a general purpose computer (e.g., a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 2A:
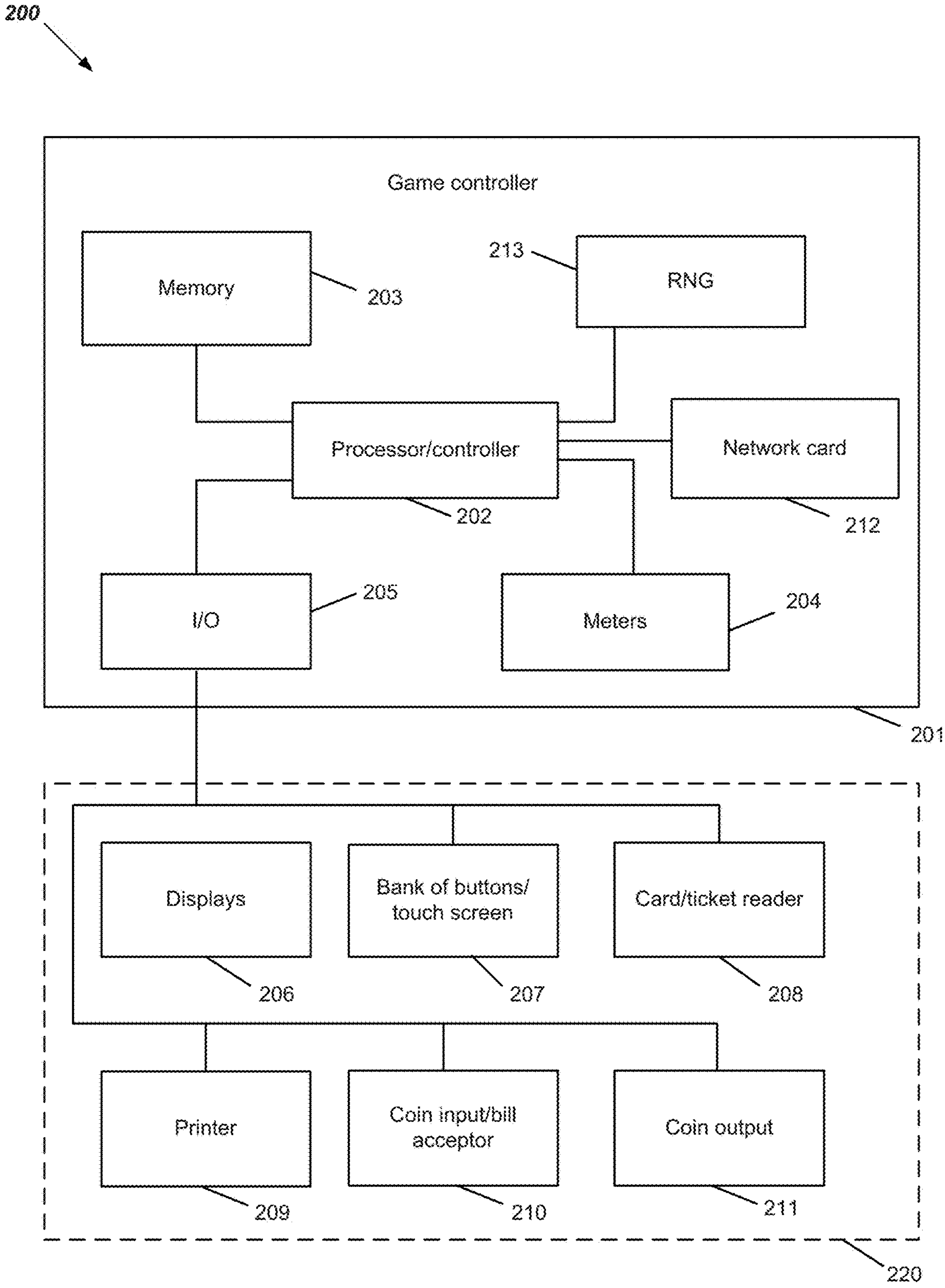
FIG. 2A is a block diagram of the functional components of a gaming machine.

FIG. 2A shows a block diagram of operative components of a typical gaming machine which may be the same as or different from the gaming machine of FIG. 1A.

As shown in FIG. 2A, a gaming machine 200 includes a game controller 201 having a processor 202 mounted on a circuit board. Instructions and data to control operation of processor 202 are stored in a memory 203, which is in data communication with the processor 202. Typically, gaming machine 200 will include both volatile and non-volatile memory and more than one of each type of memory, with such memories being collectively represented by the memory 203.

Gaming machine 200 has credit meters 204 for purposes including ensuring regulatory compliance and monitoring player credit, and an input/output (I/O) interface 205 for communicating with peripheral devices of the gaming machine 200. Input/output (I/O) interface 205 and/or the peripheral devices may be intelligent devices with their own memory for storing associated instructions and data for use with the input/output interface or the peripheral devices. A random number generator module 213 generates random numbers for use by processor 202. Persons skilled in the art will appreciate that the reference to random numbers includes pseudo-random numbers.

In the example shown in FIG. 2A, a player interface 220 includes peripheral devices that communicate with game controller 201 including one or more displays 206, a touch screen and/or buttons 207 (which provide a game play mechanism), a card and/or ticket reader 208, a printer 209, a bill acceptor and/or coin input mechanism 210 and a coin output mechanism 211. Additional hardware may be included as part of the gaming machine 200, or hardware may be omitted as required for the specific implementation. For example, while buttons or touch screens are typically used in gaming machines to allow a player to place a wager and initiate a play of a game, any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, gaming machine 200 may include a communications interface, for example a network card 212. Network card may, for example, send status information, accounting information or other information to a bonus controller, central controller, server or database and receive data or commands from the bonus controller, central controller, server or database. In embodiments employing a player marketing module, communications over a network may be via player marketing module—e.g., the player marketing module may be in data communication with one or more of the above devices and communicate with it on behalf of the gaming machine.

Figure 2B:
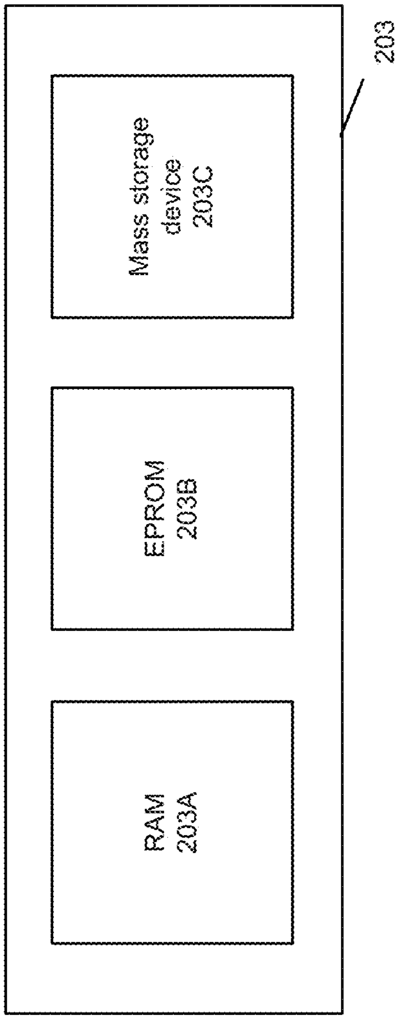
FIG. 2B is a schematic diagram of the functional components of a memory.

Referring now to FIG. 2B, the main components of an example memory 203 include random-access memory (RAM) 203A, erasable programmable read-only memory (EPROM) 203B and a mass storage device 203C. RAM 203A typically temporarily holds program files for execution by processor 202 and related data. EPROM 203B may be a boot ROM device and/or may contain some system or game related code. Mass storage device 203C is typically used to store game programs, the integrity of which may be verified and/or authenticated by the processor 202 using protected code from EPROM 203B or elsewhere.

It is also possible for the operative components of gaming machine 200 to be distributed, for example, input/output devices 206, 207, 208, 209, 210, 211 may be provided remotely from the game controller 201.

Figure 3:
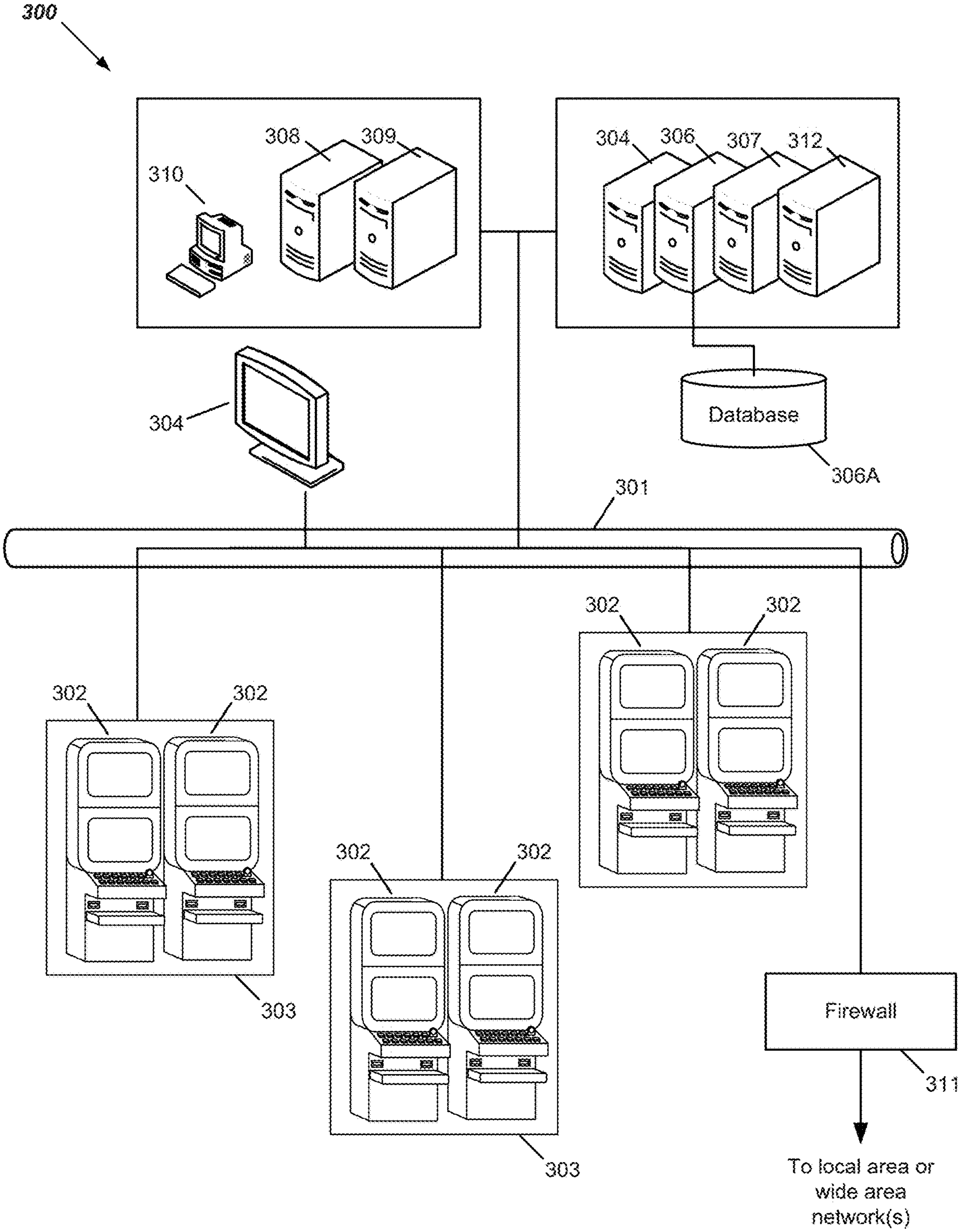
FIG. 3 is a schematic diagram of a network gaming system.

FIG. 3 shows a gaming system 300 in accordance with an alternative embodiment. Gaming system 300 includes a network 301, which for example may be an Ethernet network. Gaming machines 302, shown arranged in three banks 303 of two gaming machines 302 in FIG. 3 are connected to network 301. Gaming machines 302 provide a player operable interface and may be the same as the gaming machines shown in FIGS. 1A, 1B, and 2A, or may have simplified functionality depending on the requirements for implementing game play. While banks 303 of two gaming machines are illustrated in FIG. 3, banks of one, three or more gaming machines are also envisaged.

One or more displays 304 may also be connected to network 301. For example, displays 304 may be associated with one or more banks 303 of gaming machines. Displays 304 may be used to display representations associated with game play on gaming machines 302, and/or used to display other representations, for example promotional or informational material.

In a thick client embodiment, a game server 305 implements part of the game played by a player using a gaming machine 302 and the gaming machine 302 implements part of the game. With this embodiment, as both the game server and the gaming device implement part of the game, they collectively provide a game controller. A database management server 306 may manage storage of game programs and associated data for downloading or access by gaming machines 302 in a database 306A. Typically, if the gaming system enables players to participate in a jackpot game, a jackpot server 307 will be provided to perform accounting functions for the Jackpot game. A loyalty program server 312 may also be provided.

In a thin client embodiment, game server 305 implements most or all of the game played by a player using a gaming machine 302 and the gaming machine 302 essentially provides only the player interface. With this embodiment, game server 305 provides the game controller. The gaming machine will receive player instructions, pass these to the game server which will process them and return game play outcomes to the gaming machine for display. In a thin client embodiment, the gaming machines could be computer terminals, e.g., PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming system 300, including for example a gaming floor management server 308, and a licensing server 309 to monitor the use of licenses relating to particular games. An administrator terminal 310 is provided to allow an administrator to run network 301 and the devices connected to the network.

Gaming system 300 may communicate with other gaming systems, other local networks, for example a corporate network, and/or a wide area network such as the Internet, for example through a firewall 311.

Persons skilled in the art will appreciate that in accordance with known techniques, functionality at the server side of the network may be distributed over a plurality of different computers. For example, elements may be run as a single "engine" on one server or a separate server may be provided. For example, game server 305 could run a random generator engine. Alternatively, a separate random number generator server could be provided. Further, persons skilled in the art will appreciate that a plurality of game servers could be provided to run different games or a single game server may run a plurality of different games as required by the terminals.

When the credit input mechanism 52.1 (of FIG. 1B) has received a physical item representing a monetary value, a credit balance is established. The player may then operate the game play mechanism 56 (of FIG. 1B) to specify one or more of a plurality of wagers for the base game and to initiate a play of the base game. In an example embodiment, at least certain of the wagers that the player can wager entitles the player to win a chance to play a feature game, for example, when a trigger condition occurs. In some embodiments, when the credit input mechanism 52.1 (of FIG. 1B) has received a physical item representing a monetary value for establishing a credit balance, at least a portion of the received physical item may initiate a play of the base game directly.

Figure 4:
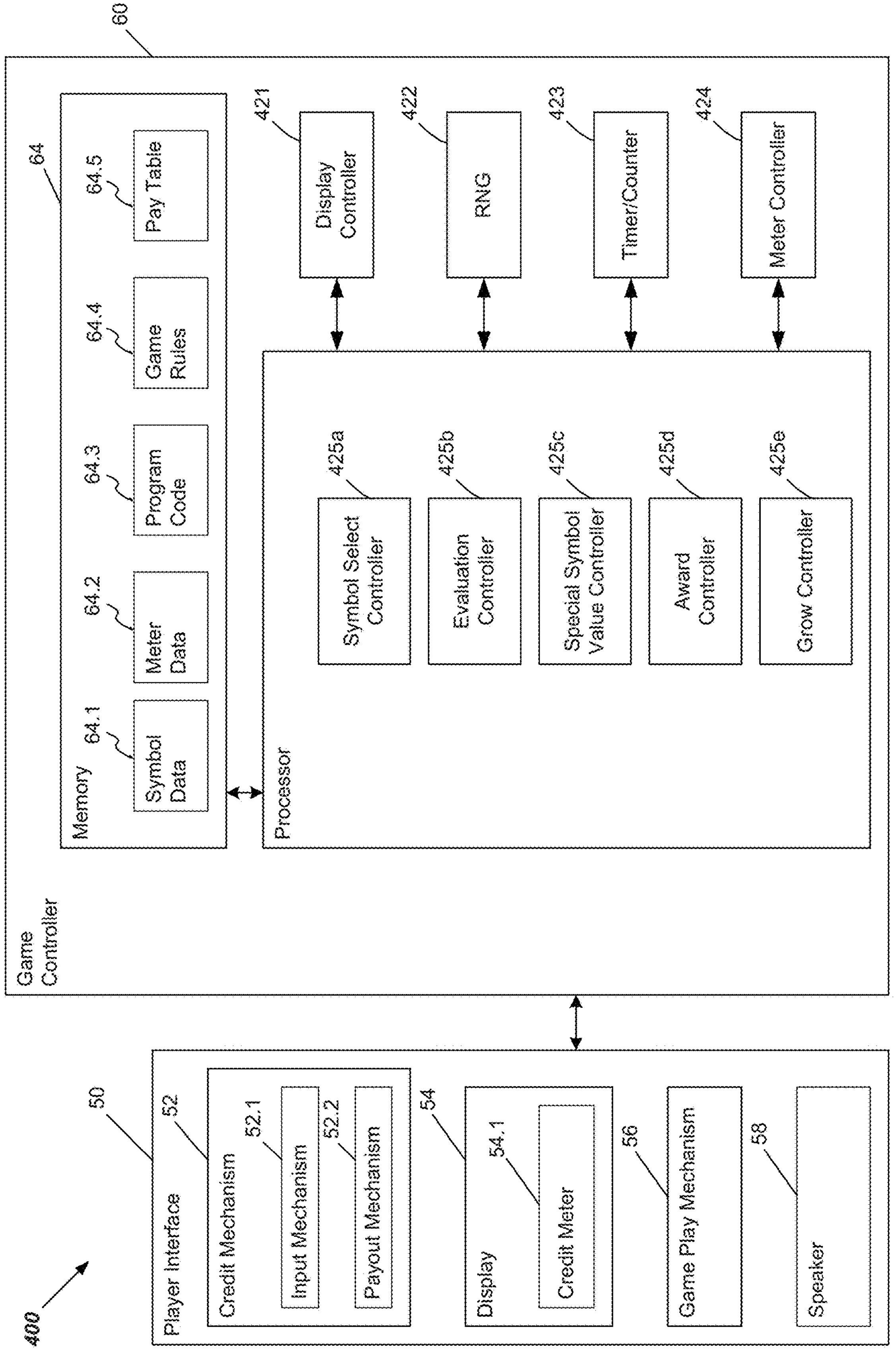
FIG. 4 is an example gaming machine in block diagram form.

Referring to FIG. 4, a gaming machine 400 (similar to the gaming machine 10 of FIG. 1A) includes a game controller 60. Game controller 60 includes a processor 62 and a memory 64. Memory 64 includes a symbol memory module 64.1 that stores data of a plurality of symbols, a meter memory module 64.2 that stores meter data of gaming machine 400, and a program code memory 64.3 that stores program code to implement a number of modules to be executed by processor 62. In the embodiment shown, memory 64 also includes a game rule memory module 64.4 that stores a plurality of game rules that specify how a game is played. Memory 64 also includes a pay table memory module 64.5 that stores a plurality of pay tables. For example, the pay tables may specify an award when an optimum overall winning combination is obtained.

Persons skilled in the art will appreciate that some or all of the components of the game controller 60 could be alternatively implemented. For example, in some embodiments, the game controller 60 and its components are implemented in the form of a dedicated circuit, or an individual application-specific-integrated-circuit (ASIC). In other embodiments, game controller 60 and its components is implemented as an individual ASIC. In other embodiments, some or all of the game controller components may be individually or collectively implemented as software modules, controllers, and/or circuitries.

In the embodiment shown, game controller 60 includes a display controller 421 which is configured to control display 54, a random number generator (RNG) 422 configured to generate a random number, and a timer/counter 423 configured to time and/or count an amount of time and/or a number of games that a base game and/or a feature game has been played, for example, without a win, an upgrade, and/or a trigger event. Game controller 60 also includes a meter controller 424 configured to generate, monitor and/or maintain meter data, for example, for display or storage based on game play, and/or to read meter data from the meter data memory module 64.2.

In the embodiment shown, the processor 62 includes a symbol select controller 425*a* that communicates with the display controller 421, the RNG 422, the timer/counter 423, and/or the meter controller 424. In some embodiments, the symbol select controller 425*a* randomly selects symbols from the symbol data memory module 64.1 for display on the display 54 via the RNG 422. The display controller 421 then causes the display 54 to display the selected symbols at a plurality of display positions. The displayed symbols thus form an outcome from the symbols displayed at the display positions.

In the embodiment shown, the processor 62 includes an evaluation controller 425*b* that evaluates the symbols selected for display to determine if the selected symbols form a winning outcome.

In the embodiment shown, the display 54 displays symbols selected by the symbol select controller 425*a* in a plurality of groups of display positions representing a plurality of reels. Each group of display positions represents a reel.

In embodiments in accordance with the present invention, gaming machines, devices, and/or systems, such as the gaming machine 400 of FIG. 4, may be configured to support use of pay modalities that are overlaid on selected symbols in games.

For example, in the gaming machine 400 the processor 62 also includes a special symbol value controller 425*c* that assigns a plurality of values to a plurality of special symbols. In some embodiments, the memory 64 also stores the plurality of values to be assigned. Conversely, the symbol data memory module 64.1 also stores the plurality of special symbols. An example special symbol is a Tarzan symbol, as shown in FIGS. 8-11.

In some embodiments, the special symbol value controller 425*c* assigns different credit values to different reels. For example, the special symbol value controller 425*c* assigns a value of 200 credits, 300 credits, and/or 500 credits to the special symbols on a predetermined reel, for example, reel 3. Similarly, the special symbol value controller 425*c* assigns a value of 500 credits, 1000 credits, 2000 credits, and/or 10000 credits to the special symbols on a predetermined reel, for example, reel 4, and minor and/or major jackpots to the special symbols on a predetermined reel, for example, reel 5.

In some embodiments, only a plurality of the reels, for example, reels 3, 4, and 5, may include the special symbols, and the remaining reels, for example, reels 1 and 2, may include regular or normal symbols. In such cases, the remaining reels, for example, reels 1 and 2, may also include wild symbols, while reels 3, 4, and 5, may be without wilds. Referring back to FIG. 4, the processor 62 also includes an award controller 425*d* to determine an award to be paid based on data in the pay table memory module 64.5, for example, via the payout mechanism 52.2, and a grow controller 425*e* to determine if a condition is met based on, for example, symbols displayed on the display 54, a predetermined number of times a game has been played, or a predetermined number of reel spins taken place as monitored by the timer/counter 423, and/or to grow or increase the plurality of symbols to be displayed on display 54. In some embodiments, if reels 1 and 2 display wild symbols, the grow controller 425*e* may reference a random weighted table to determine if reels 3, 4 and 5 may grow and at what height.

In some embodiments, when the symbol select controller 425*a* selects wild symbols to be displayed in reels 1 and 2, the grow controller 425*e* may also trigger a bonus game that includes the special symbols. For example, in the bonus game, if a special symbol is displayed or "lands" on reel 3, a player may be paid at least 2 times his wager. In some cases, special symbols may land as a stack with at least two special symbols. This may strengthen the value of the bonus game and offer a variety of wins. In the event that a player doesn't catch a special symbol on reel 3, the player may have Wilds on reels 1 and 2, and may win at least a 3 of a kind win. In some cases, the wins may be significant.

Figure 5:
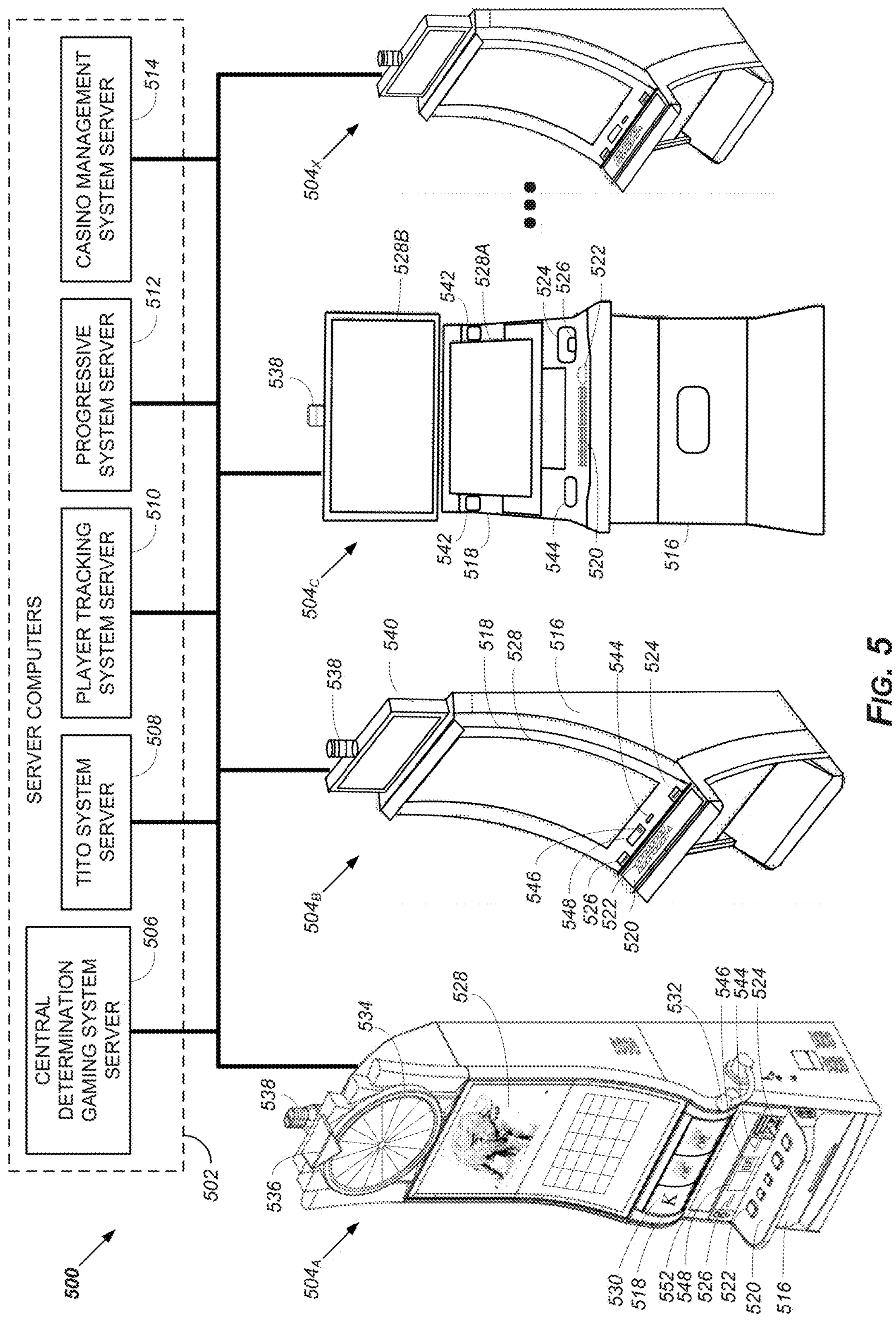
FIG. 5 is an example diagram showing several EGMs networked with various gaming related servers.

FIG. 5 illustrates several different models of EGMs which may be networked to various gaming related servers. The present invention can be configured to work as a system 500 in a gaming environment including one or more server computers 502 (e.g., slot servers of a casino) that are in communication, via a communications network, with one or more gaming devices 504A-504X (EGMs, slots, video poker, bingo machines, etc.). The gaming devices 504A-504X may alternatively be portable and/or remote gaming devices such as, but not limited to, a smart phone, a tablet, a laptop, or a game console.

Communication between the gaming devices 504A-504X and the server computers 502, and among the gaming devices 504A-504X, may be direct or indirect, such as over the Internet through a website maintained by a computer on a remote server or over an online data network including commercial online service providers, Internet service providers, private networks, and the like. In other embodiments, the gaming devices 504A-504X may communicate with one another and/or the server computers 502 over RF, cable TV, satellite links and the like.

In some embodiments, server computers 502 may not be necessary and/or preferred. For example, the present invention may, in one or more embodiments, be practiced on a standalone gaming device such as gaming device 504A, gaming device 504B or any of the other gaming devices 504C-504X. However, it is typical to find multiple EGMs connected to networks implemented with one or more of the different server computers 502 described herein.

The server computers 502 may include a central determination gaming system server 506, a ticket-in-ticket-out (TITO) system server 508, a player tracking system server 510, a progressive system server 512, and/or a casino management system server 514. Gaming devices 504A-504X may include features to enable operation of any or all servers for use by the player and/or operator (e.g., the casino, resort, gaming establishment, tavern, pub, etc.). For example, game outcomes may be generated on a central determination gaming system server 506 and then transmitted over the network to any of a group of remote terminals or remote gaming devices 504A-504X that utilize the game outcomes and display the results to the players.

Gaming device 504A is often of a cabinet construction which may be aligned in rows or banks of similar devices for placement and operation on a casino floor. The gaming device 504A often includes a main door 516 which provides access to the interior of the cabinet. Gaming device 504A typically includes a button area or button deck 520 accessible by a player that is configured with input switches or buttons 522, an access channel for a bill validator 524, and/or an access channel for a ticket printer 526.

In FIG. 5, gaming device 504A is shown as a Relm XL™ model gaming device manufactured by Aristocrat® Technologies, Inc. As shown, gaming device 504A is a reel machine having a gaming display area 518 comprising a number (typically 3 or 5) of mechanical reels 530 with various symbols displayed on them. The reels 530 are independently spun and stopped to show a set of symbols within the gaming display area 518 which may be used to determine an outcome to the game.

In many configurations, the gaming machine 504A may have a main display 528 (e.g., video display monitor) mounted to, or above, the gaming display area 518. The main display 528 can be a high-resolution liquid-crystal display (LCD), plasma, light-emitting diode (LED), or organic light-emitting diode (OLED) panel which may be flat or curved as shown, a cathode ray tube, or other conventional electronically controlled video monitor.

In some embodiments, the bill validator 524 may also function as a "ticket-in" reader that allows the player to use a casino issued credit ticket to load credits onto the gaming device 504A (e.g., in a cashless ticket ("TITO") system). In such cashless embodiments, the gaming device 504A may also include a "ticket-out" printer 526 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 526 on the gaming device 504A.

In some embodiments, a player tracking card reader 544, a transceiver for wireless communication with a player's smartphone, a keypad 546, and/or an illuminated display 548 for reading, receiving, entering, and/or displaying player tracking information is provided in EGM 504A. In such embodiments, a game controller within the gaming device 504A can communicate with the player tracking server system 510 to send and receive player tracking information.

Gaming device 504A may also include a bonus topper wheel 534. When bonus play is triggered (e.g., by a player achieving a particular outcome or set of outcomes in the primary game), bonus topper wheel 534 is operative to spin and stop with indicator arrow 536 indicating the outcome of the bonus game. Bonus topper wheel 534 is typically used to play a bonus game, but it could also be incorporated into play of the base or primary game.

A candle 538 may be mounted on the top of gaming device 504A and may be activated by a player (e.g., using a switch or one of buttons 522) to indicate to operations staff that gaming device 504A has experienced a malfunction or the player requires service. The candle 538 is also often used to indicate a jackpot has been won and to alert staff that a hand payout of an award may be needed.

There may also be one or more information panels 552 which may be a back-lit, silkscreened glass panel with lettering to indicate general game information including, for example, a game denomination (e.g., $0.25 or $1), pay lines, pay tables, and/or various game related graphics. In some embodiments, the information panel(s) 552 may be implemented as an additional video display.

Gaming devices 504A have traditionally also included a handle 532 typically mounted to the side of main cabinet 516 which may be used to initiate game play.

Figure 6:
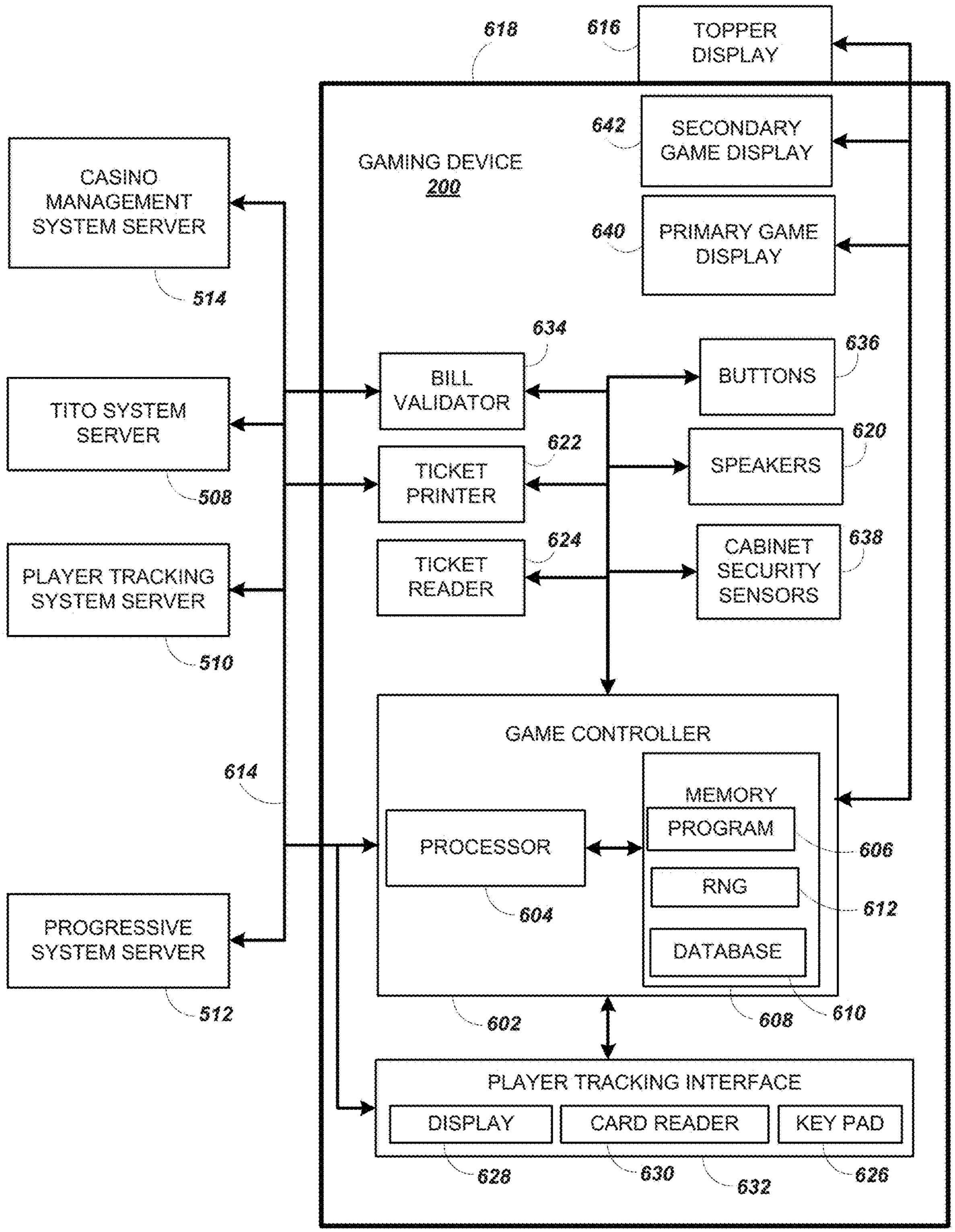
FIG. 6 is a block diagram showing various functional elements of an example EGM.

Many or all the above described components can be controlled by circuitry (e.g., a gaming controller) housed inside the main cabinet 516 of the gaming device 504A, the details of which are shown in FIG. 6.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 504B illustrated in FIG. 5 is the Arc™ model gaming device manufactured by Aristocrat® Technologies, Inc. Note that where possible, reference numerals identifying similar features of the gaming device 504A embodiment are also identified in the gaming device 504B embodiment using the same reference numbers. Gaming device 504B does not include physical reels and instead shows game play functions on main display 528. An optional topper screen 540 may be used as a secondary game display for bonus play, to show game features or attraction activities while a game is not in play, or any other information or media desired by the game designer or operator. In some embodiments, topper screen 540 may also or alternatively be used to display progressive jackpot prizes available to a player during play of gaming device 504B.

Example gaming device 504B includes a main cabinet 516 including a main door 518 which opens to provide access to the interior of the gaming device 504B. The main or service door 518 is typically used by service personnel to refill the ticket-out printer 526 and collect bills and tickets inserted into the bill validator 524. The door 518 may also be accessed to reset the machine, verify and/or upgrade the software, and for general maintenance operations.

Another example gaming device 504C shown is the Helix™ model gaming device manufactured by Aristocrat® Technologies, Inc. Gaming device 504C includes a main display 528A that is in a landscape orientation. Although not illustrated by the front view provided, the landscape display 528A may have a curvature radius from top to bottom, or alternatively from side to side. In some embodiments, display 528A is a flat panel display. Main display 528A is typically used for primary game play while secondary display 528B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 504A-504C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 6 is a block diagram depicting example internal electronic components of a gaming device 600 connected to various external systems. All or parts of the example gaming device 600 shown could be used to implement any one of the example gaming devices 504A-X depicted in FIG. 5. The games available for play on the gaming device 600 are controlled by a game controller 602 that includes one or more processors 604 and a game that may be stored as game software or a program 606 in a memory 608 coupled to the processor 604. The memory 608 may include one or more mass storage devices or media that are housed within gaming device 600. Within the mass storage devices and/or memory 608, one or more databases 610 may be provided for use by the program 606. A random number generator (RNG) 612 that can be implemented in hardware and/or software is typically used to generate random numbers that are used in the operation of game play to ensure that game play outcomes are random and meet regulations for a game of chance.

Alternatively, a game instance (e.g., a play or round of the game) may be generated on a remote gaming device such as a central determination gaming system server 506 (not shown in FIG. 6 but see FIG. 5). The game instance is communicated to gaming device 600 via the network 614 and then displayed on gaming device 600. Gaming device 600 may execute game software, such as but not limited to video streaming software that allows the game to be displayed on gaming device 600. When a game is stored on gaming device 600, it may be loaded from a memory 608 (e.g., from a read only memory (ROM)) or from the central determination gaming system server 506 to memory 608. The memory 608 may include RAM, ROM or another form of storage media that stores instructions for execution by the processor 604.

The gaming device 600 may include a topper display 616 or another form of a top box (e.g., a topper wheel, a topper screen, etc.) which sits above main cabinet 618. The gaming cabinet 618 or topper display 616 may also house a number of other components which may be used to add features to a game being played on gaming device 600, including speakers 620, a ticket printer 622 which prints bar-coded tickets or other media or mechanisms for storing or indicating a player's credit value, a ticket reader 624 which reads bar-coded tickets or other media or mechanisms for storing or indicating a player's credit value, and a player tracking interface 632. The player tracking interface 632 may include a keypad 626 for entering information, a player tracking display 628 for displaying information (e.g., an illuminated or video display), and a card reader 630 for receiving data and/or communicating information to and from media or a device such as a smart phone enabling player tracking. Ticket printer 622 may be used to print tickets for a TITO system server 508. The gaming device 600 may further include a bill validator 634, buttons 636 for player input, cabinet security sensors 638 to detect unauthorized opening of the cabinet 618, a primary game display 640, and a secondary game display 642, each coupled to and operable under the control of game controller 602.

Gaming device 600 may be connected over network 614 to player tracking system server 510. Player tracking system server 510 may be, for example, an OASIS® system manufactured by Aristocrat® Technologies, Inc. Player tracking system server 510 is used to track play (e.g., amount wagered, games played, time of play and/or other quantitative or qualitative measures) for individual players so that an operator may reward players in a loyalty program.

The player may use the player tracking interface 632 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 504A-504X, 600, are highly regulated to ensure fairness and, in many cases, gaming devices 504A-504X, 600 are operable to award monetary awards (e.g., typically dispensed in the form of a redeemable voucher). Therefore, to satisfy security and regulatory requirements in a gaming environment, hardware and software architectures are implemented in gaming devices 504A-504X, 600 that differ significantly from those of general-purpose computers.

Adapting general purpose computers to function as gaming devices 600 is not simple or straightforward because of: 1) the regulatory requirements for gaming devices 600, 2) the harsh environment in which gaming devices 600 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 600, he/she can insert cash or a ticket voucher through a coin acceptor (not shown) or bill validator 634 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 630. During the game, the player views the game outcome on the game displays 640, 642. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 636, the primary game display 640 which may be a touch screen, or using some other device which enables a player to input information into the gaming device 600.

During certain game events, the gaming device 600 may display visual and auditory effects that can be perceived by the player. These effects add to the excitement of a game, which makes a player more likely to enjoy the playing experience. Auditory effects include various sounds that are projected by the speakers 620. Visual effects include flashing lights, strobing lights or other patterns displayed from lights on the gaming device 600 or from lights behind the information panel 552 (FIG. 5).

When the player is done, he/she cashes out the credit balance (typically by pressing a cash out button to receive a ticket from the ticket printer 622). The ticket may be “cashed-in” for money or inserted into another machine to establish a credit balance for play.

In embodiments in accordance with the present inventions, gaming devices, such as gaming devices 504A-504X, 600 may be configured to support use of pay modalities that are overlaid on selected symbols, substantially in the same manner as described with reference the gaming machine 400, as disclosed with respect to FIGS. 4 and FIGS. 8-11.

Figure 7:
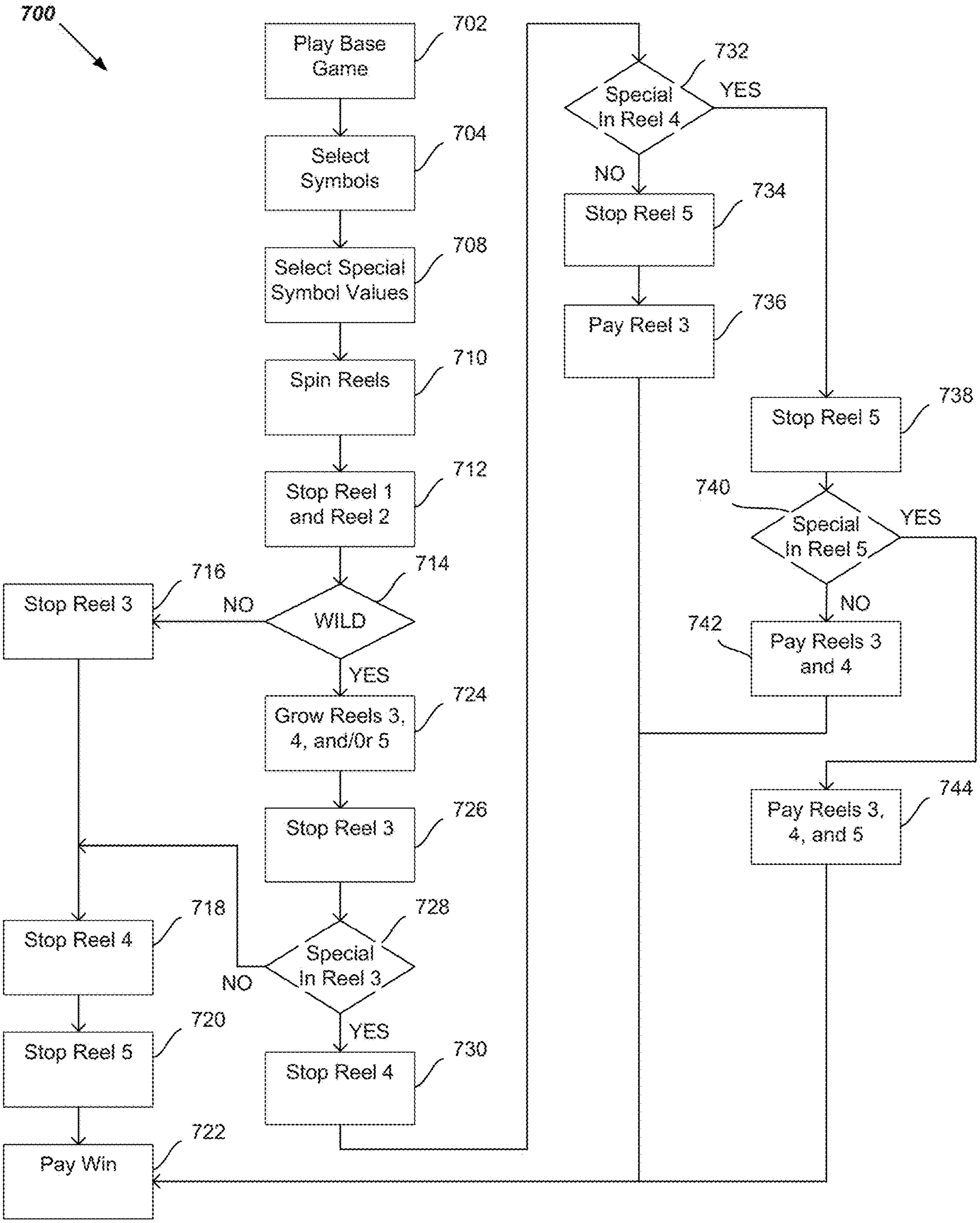
FIG. 7 is a flow chart of a pay modality game process.

FIG. 7 is a flow chart of a pay modality game process 700, which may be performed in a gaming machine, such as the gaming machine 400 FIG. 4.

At block 702, a game controller (e.g., the game controller 60 of gaming machine 400 FIG. 4) initiates a base game when a player actuates the game play mechanism 56 of the player interface 52. At block 704, the symbol select controller 425*a* selects a plurality of symbols to be displayed. In some embodiments, the game controller 60 randomly determines a plurality of stop positions for a plurality of reels, reels 1 through 5.

At block 708, the special symbol value controller 425*c* randomly assigns values to a plurality of special symbols on a predetermined number of the reels, for example, reels 3, 4, 5, with a plurality of corresponding weighted lists stored in the memory 64. The display controller 421, at block 710, causes the display 54 to display a spinning of the reels.

For example, for reel 3, the following weighted list may be used. The award may be multiplied by a bet multiplier

| PRIZE | WEIGHT |
|---|---|
| 200 | 45,000,000 |
| 300 | 45,000,000 |
| 500 | 10,000,000 |
| TOTAL | 100,000,000 |

For example, for reel 4, the following weighted list may be used. The award may be multiplied by a bet multiplier.

| PRIZE | WEIGHT |
|---|---|
| 500 | 45,000,000 |
| 1000 | 45,000,000 |
| 2000 | 8,500,000 |
| 10000 | 1,500,000 |
| TOTAL | 100,000,000 |

For example, for reel 5, the following weighted list may be used. The award may be multiplied by a bet multiplier.

| PRIZE | WEIGHT |
|---|---|
| Minor | 90,000,000 |
| Major | 10,000,000 |
| TOTAL | 100,000,000 |

At block 712, the display controller 421 causes the display 54 to display a stopping of a plurality of the reels, for example, reels 1 and 2, and to display a plurality of symbols selected in block 708. At block 714, the evaluation controller 425*b* determines if the displayed symbols of the stopped reels include wild symbols. If block 714 determines that the displayed symbols of the stopped reels do not include wild symbols, the pay modality game process 700 proceeds to block 716 to stop reel 3 from spinning via the display controller 421, followed by stopping reel 4 and reel 5 from spinning at block 718 and block 720, respectively. At block 722, the award controller 425*d* pays a standard award, if any has been awarded.

At block 724, that is, if block 714 determines that the displayed symbols of the stopped reels include wild symbols, the grow controller 425*e* starts a fire windup or a windup on the first predetermined reel, and increases the numbers of display positions of a plurality of predetermined reels. For example, in some embodiments, the number of display positions of reel 3 may grow from three display positions to four display positions. In other embodiments, the number of display positions of reel 4 may grow from three display positions to five display positions. In some embodiments, a fire windup or a windup is an extended reel spin with animation and sound to draw the player’s attention to the reels and indicate that something significant may be happening.

| HEIGHT | WEIGHT |
|---|---|
| 3 | 66,500,000 |
| 4 | 25,000,000 |
| 5 | 8,500,000 |
| TOTAL | 100,000,000 |

At block 726, the display controller 421 causes the display 54 to display a stopping of the first predetermined reel, for example, reel 3. At block 728, the evaluation controller **425*b* determines if the displayed symbols of the stopped first predetermined reel, for example, reel 3, include the special symbols. If the evaluation controller 425*b* determines that the displayed symbols of the stopped first predetermined reel, for example, reel 3, do not include at least one special symbol, the game process 700 proceeds to block 718**.

If the evaluation controller **425*b* determines that the displayed symbols of the stopped first predetermined reel, for example, reel 3, include at least one special symbol, the game process 700 proceeds to block 730 in which the display controller 421 causes the display 54** to display fire windup on the second predetermined reel, for example, reel 4 and a stopping of the second predetermined reel, reel 4.

At block 732, the evaluation controller **425*b* determines if the displayed symbols of the stopped second predetermined reel, for example, reel 4, include the special symbols. If the evaluation controller 425*b* determines that the displayed symbols of the stopped second predetermined reel, for example, reel 4, do not include at least one special symbol, the game process 700 proceeds to block 734 to stop reel 5 from spinning, and proceeds to block 736** to pay the special symbols on the first predetermined reel, reel 3.

If the evaluation controller **425*b* determines that the displayed symbols of the stopped second predetermined reel, for example, reel 4, include at least one special symbol, the game process 700 proceeds to block 738 in which the display controller 421 causes the display 54** to display fire windup on the third predetermined reel, for example, reel 5 and a stopping of the third predetermined reel, reel 5.

At block 740, the evaluation controller **425*b* determines if the displayed symbols of the stopped third predetermined reel, for example, reel 5, include the special symbols. If the evaluation controller 425*b* determines that the displayed symbols of the stopped third predetermined reel, for example, reel 5, do not include at least one special symbol, the game process 700 proceeds to block 742 to pay the special symbols on the first and second predetermined reels, reels 3 and 4. If the evaluation controller 425*b* determines that the displayed symbols of the stopped third predetermined reel, for example, reel 5, include at least one special symbol, the game process 700 proceeds to block 744** to pay the special symbols on the first, second, and third predetermined reels, reels 3, 4, and 5.

A reel power Tarzan game may serve as an example. All special symbols (Tarzan symbols) on reel 3 contain an overlaid credit value equal to 2, 3 or 5 times the bet or wager. All Tarzan symbols on reel 4 contain an overlaid credit values equal to 5, 10, 20 or 100 times the bet. All Tarzan symbols on reel 5 contain an overlaid Jackpot award for the “Major” jackpot or the “Minor” jackpot.

In some embodiments, 3 of a kind Tarzan win awards the 3 of a kind win and additionally all of the visible credit values on reel 3. A 4 of kind Tarzan win awards the 4 of a kind win and additionally all of the visible credit values on reels 3 and 4. And a 5 of a kind Tarzan win will award the 5 of a kind win and additionally all of the visible credit values on reels 3 and 4 and all of the visible Jackpots on reel 5.

The excitement of the game is enhanced by stacking the Tarzan symbols on reels 3, 4 and 5, thus allowing for multiple credit values and jackpots to be awarded in a single spin.

During the free games feature all wins are multiplied by ×2, ×3, ×5, or ×10. That includes all credit values paid on reels 3 and 4 and all jackpots awarded on reel 5.

Overlaying the pay modality on an existing symbol allows the symbol to be used to form a winning pay combination and also award additional values.

From the Tarzan example, all Tarzan symbols on reels 3, 4 and 5 have overlaid pay modalities. This overlay is unique in that the inclusion of a pay modality for a symbol on a reel is universal for that symbol on that reel. That is, all Tarzan symbols on reel 3, 4 and 5 contain an overlaid pay modality 100% of the time.

Figure 8:
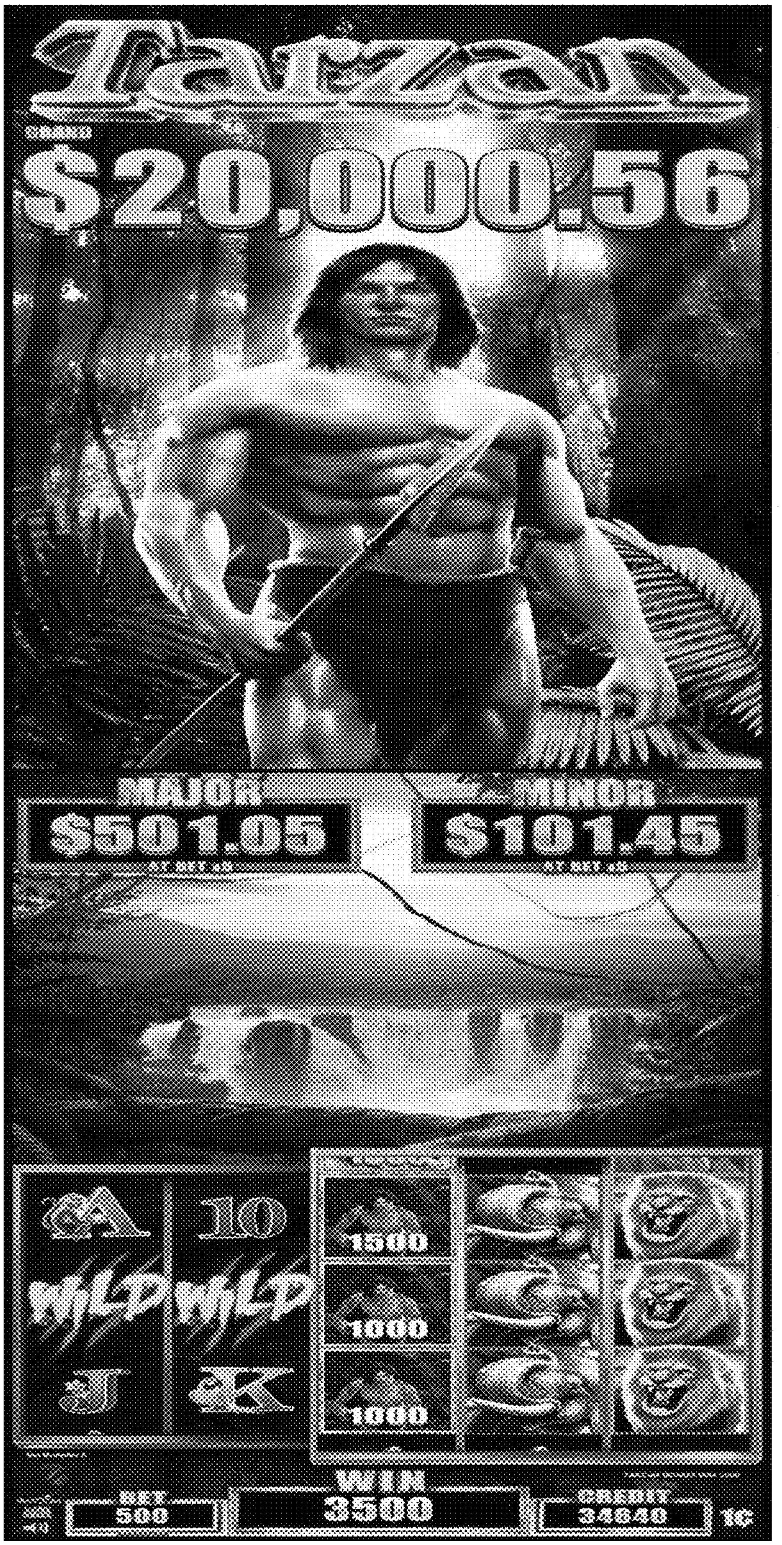
FIG. 8 shows a first display of a game with a plurality of special symbols.

FIG. 8 shows a first display 800 of a game with a plurality of special symbols. The first display 800 shows reels 1 and 2 display wild symbols, and reel 3 displays three special symbols. In this embodiment, the player wins 3500 credits from the special symbols on reel 3.

Figure 9:
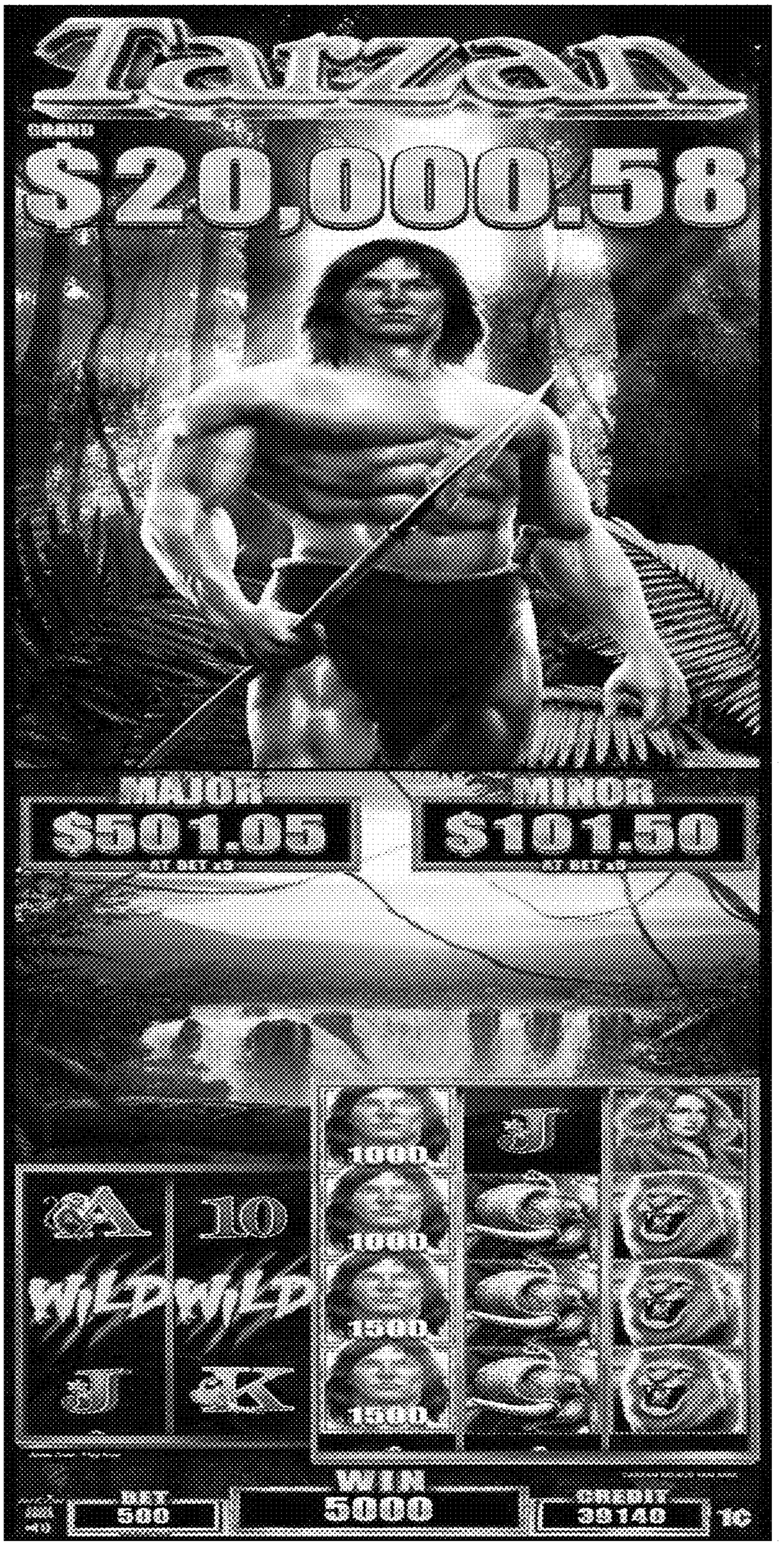
FIG. 9 shows a second display of a game with a plurality of special symbols.

FIG. 9 shows a second display 900 of a game with a plurality of special symbols. The second display 900 shows reels 1 and 2 display wild symbols. The second display 900 also shows reels 3, 4, 5 have grown to include four display positions per reel. In this embodiment, reel 4 displays four special symbols, and thus the player wins 5000 credits from the four special symbols on reel 3.

Figure 10:
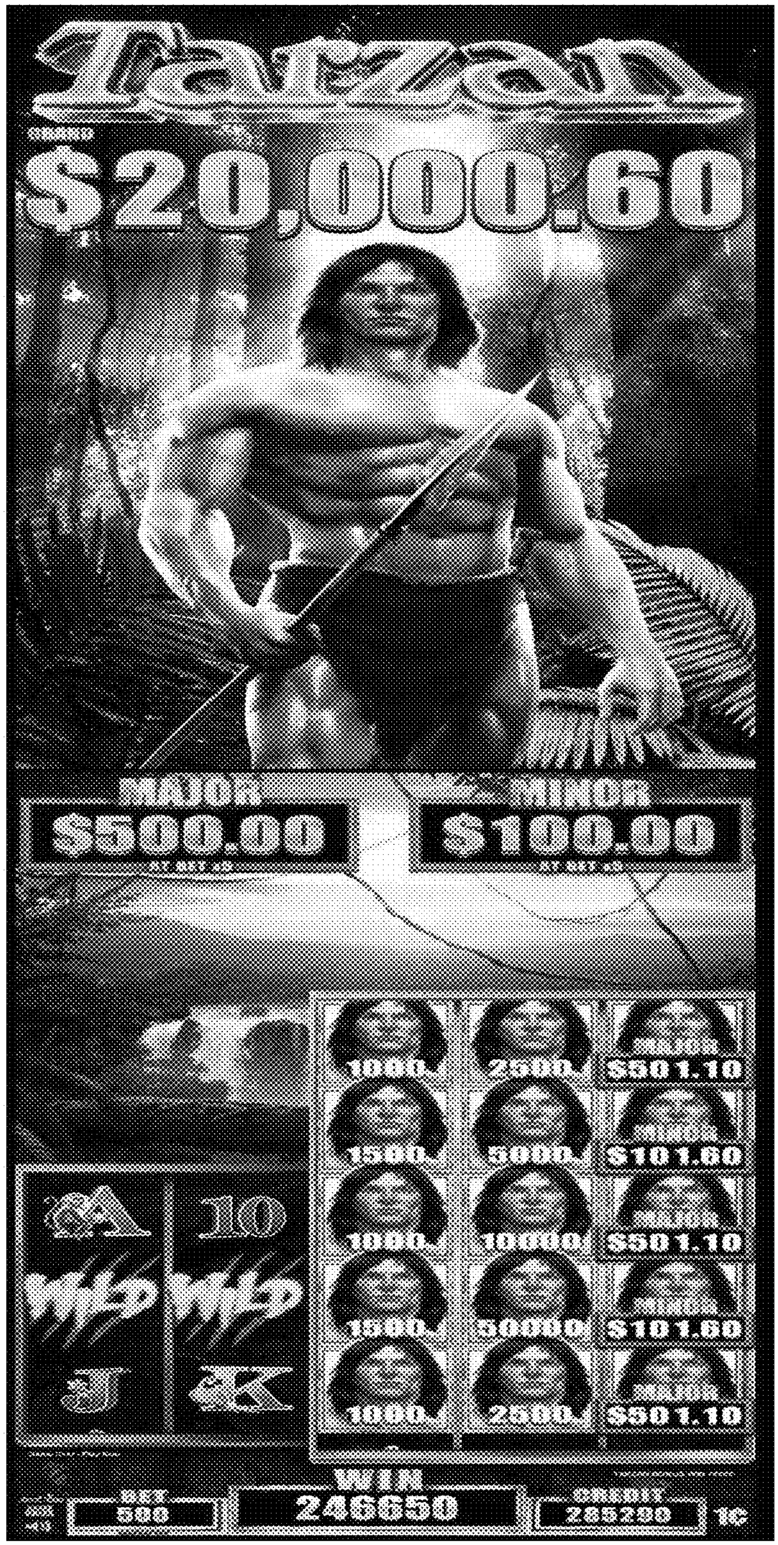
FIG. 10 shows a third display of a game with a plurality of special symbols.

FIG. 10 shows a third display 1000 of a game with a plurality of special symbols. The third display 1000 shows reels 1 and 2 display wild symbols. The third display 1000 also shows reels 3, 4, 5 have grown to include five display positions per reel. In this embodiment, reels 3, 4, 5 show a total of 15 special symbols, and thus the player wins 246650 credits from the special symbols on reels 3, 4, 5.

Figure 11:
FIG. 11 shows a fourth display of a game with a plurality of special symbols.

FIG. 11 shows a fourth display 1100 of a game with a plurality of special symbols. The fourth display 1100 shows reels 1 and 2 display wild symbols. However, the fourth display 1100 also shows reels 3, 4, 5 have grown to include four display positions per reel. In this embodiment, reel 5 shows a special symbol, and thus the player is awarded a minor jackpot of $21.98 plus other credits.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g., an electrically erasable programmable read-only memory (EEPROM), (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention. In particular, it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense—e.g., to specify the presence of the stated features but not to preclude the presence or addition of further features in various embodiments of the invention.

What is claimed is:

1. An electronic gaming system comprising:

a gaming device and at least one server communicatively coupled to one another and collectively having a device processor, a random number generator, and memory that stores a symbol set including a plurality of predetermined symbols, a plurality of special symbols, and instructions that, when executed, cause the device processor to:

receive, from the at least one server, data indicative of an outcome, and cause the gaming device to:

animate, on a reel and an adjacent reel, a plurality of symbols randomly selected from the symbol set based at least in part on the outcome and a random number generated by the random number generator, overlay a first set of special values on the special symbols selected for the reel and a second set of special values that are higher than the first set of special values on the special symbols selected for the adjacent reel, identify a win combination formed from a first special symbol selected for the reel, a second special symbol selected for the adjacent reel, and a third predetermined symbol selected for a third reel, and display a payout determined based on the win combination, a first special value overlaying the first special symbol, and a second special value overlaying the second special symbol.

2. The electronic gaming system of claim 1, wherein the instructions, when executed, further cause the gaming device to animate stacking the reel with the first special symbol thereby increasing the payout.

3. The electronic gaming system of claim 1, wherein the instructions, when executed, further cause the device processor to determine the win combination from the special symbols displayed for the reel, the special symbols displayed for the adjacent reel, and the third predetermined symbol.

4. The electronic gaming system of claim 1, wherein the third reel includes a plurality of display positions, and wherein the instructions, when executed, further cause the gaming device to animate the plurality of display positions increasing to an increased plurality of display positions, when at least one of the reel and the adjacent reel includes a wild symbol.

5. The electronic gaming system of claim 1, wherein the instructions, when executed, further cause the gaming device to animate a different payout based on a jackpot prize selected for each of the reel and the adjacent reel.

6. The electronic gaming system of claim 1, wherein the instructions, when executed, further cause the device processor to select each special value for the reel and the adjacent reel from a weighted list of values, and wherein the weighted list of values comprises different values for different ones of the reel and the adjacent reel and for different symbols.

7. The electronic gaming system of claim 1, wherein the instructions, when executed, further cause the device processor to assign different special values to a particular special symbol for different ones of the reel and the adjacent reel.

8. A method of increasing a payout on an electronic gaming system that includes a gaming device coupled to at least one server and having a memory storing a symbol set, the method comprising:

transmitting data indicative of an outcome from the at least one server to the gaming device;

animating, on a reel and an adjacent reel, a plurality of symbols randomly selected from the symbol set based at least in part on the outcome and a random number generated by a random number generator included in the gaming device or the at least one server;

in response to the symbols including a plurality of special symbols selected for the reel and the adjacent reel, overlaying a first set of special values on the special symbols selected for the reel and a second set of special values that are higher than the first set of special values on the special symbols selected for the adjacent reel;

identifying a win combination formed from a first special symbol selected for the reel, a second special symbol selected for the adjacent reel, and a third predetermined symbol selected for a third reel; and displaying the payout determined based on the win combination, a first special value overlaying the first special symbol, and a second special value overlaying the second special symbol.

9. The method of claim 8, further comprising stacking the reel with the first special symbol thereby increasing the payout.

10. The method of claim 8, further comprising determining the win combination from the special symbols displayed for the reel, the special symbols displayed for the adjacent reel, and the third predetermined symbol.

11. The method of claim 8, wherein the third reel includes a plurality of display positions, and further comprising increasing the plurality of display positions to an increased plurality of display positions, when at least one of the reel and the adjacent reel includes a wild symbol.

12. The method of claim 8, further comprising displaying a different payout based on a jackpot prize selected for each of the reel and the adjacent reel.

13. The method of claim 8, further comprising selecting each special value for the reel and the adjacent reel from a weighted list of values, and wherein the weighted list of values comprises different values for different ones of the reel and the adjacent reel and for different symbols.

14. The method of claim 8, further comprising assigning different special values to a particular special symbol for different ones of the reel and the adjacent reel.

15. A non-transitory computer-readable medium comprising a symbol set and a plurality of instructions that, when executed by a processor of a in a remote gaming device that is coupled to at least one server and includes a random number generator, cause the gaming device to:

receive, from the at least one server, data indicative of an outcome;

animate, on a reel and an adjacent reel, a plurality of symbols being randomly selected from the symbol set based at least in part on the outcome and a random number generated by the random number generator;

overlay a first set of special values on the special symbols selected for the reel and a second set of special values that are higher than the first set of special values on the special symbols selected for the adjacent reel;

form a win combination from a first special symbol selected for the reel, a second special symbol selected for the adjacent reel, and a third predetermined symbol selected for a third reel; and display a payout determined based on the win combination, a first special value overlaying the first special symbol, and a second special value overlaying the second special symbol.

16. The non-transitory computer-readable medium of claim 15, wherein the instructions, when executed, further cause the processor to stack the reel with the first special symbol thereby increasing the payout.

17. The non-transitory computer-readable medium of claim 15, wherein the instructions, when executed, further cause the processor to determine the win combination from the special symbols displayed for the reel, the special symbols displayed for the adjacent reel, and the third predetermined symbol.

18. The non-transitory computer-readable medium of claim 15, wherein the third reel includes a plurality of display positions, and wherein the instructions, when executed, further cause the processor to increase the plurality of display positions to an increased plurality of display positions, when at least one of the reel and the adjacent reel includes a wild symbol.

19. The non-transitory computer-readable medium of claim 15, wherein the instructions, when executed, further cause the processor to display a different payout based on a jackpot prize selected for each of the reel and the adjacent reel.

20. The non-transitory computer-readable medium of claim 15, wherein the instructions, when executed, further cause the processor to select each special value for the reel and the adjacent reel from a weighted list of values, and wherein the weighted list of values comprises different values for different ones of the reel and the adjacent reel and for different symbols.

* * * * *